United States Patent [19]

Shapiro

[11] 3,953,833
[45] Apr. 27, 1976

[54] MICROPROGRAMMABLE COMPUTER HAVING A DUAL FUNCTION SECONDARY STORAGE ELEMENT

[75] Inventor: Allen L. Shapiro, Irvine, Calif.

[73] Assignee: Technology Marketing Incorporated, Santa Ana, Calif.

[22] Filed: Aug. 21, 1974

[21] Appl. No.: 499,322

[52] U.S. Cl. ............................................. 340/172.5
[51] Int. Cl.² ...................... G06F 9/06; G06F 9/16; G06F 13/00
[58] Field of Search ................................. 340/172.5

[56] References Cited
UNITED STATES PATENTS

| | | | |
|---|---|---|---|
| 3,389,376 | 6/1968 | Packard | 340/172.5 |
| 3,404,378 | 10/1968 | Threadgold | 340/172.5 |
| 3,618,028 | 11/1971 | Johnson | 340/172.5 |
| 3,651,476 | 3/1972 | Metz | 340/172.5 |
| 3,651,482 | 3/1972 | Benson | 340/172.5 |
| 3,699,526 | 10/1972 | Iskiyan | 340/172.5 |
| 3,736,567 | 5/1973 | Lotan | 340/172.5 |
| 3,745,532 | 7/1973 | Erwin | 340/172.5 |
| 3,766,532 | 10/1973 | Liebel | 340/172.5 |

Primary Examiner—Gareth D. Shaw
Assistant Examiner—James D. Thomas
Attorney, Agent, or Firm—Knobbe, Martens, Olson, Hubbard & Bear

[57] ABSTRACT

A microprogrammable computer having a plurality of memory units for extremely rapid decoding of different portions of an operational instruction to substantially shorten the time and microsteps involved to accomplish a machine language instruction.

26 Claims, 10 Drawing Figures

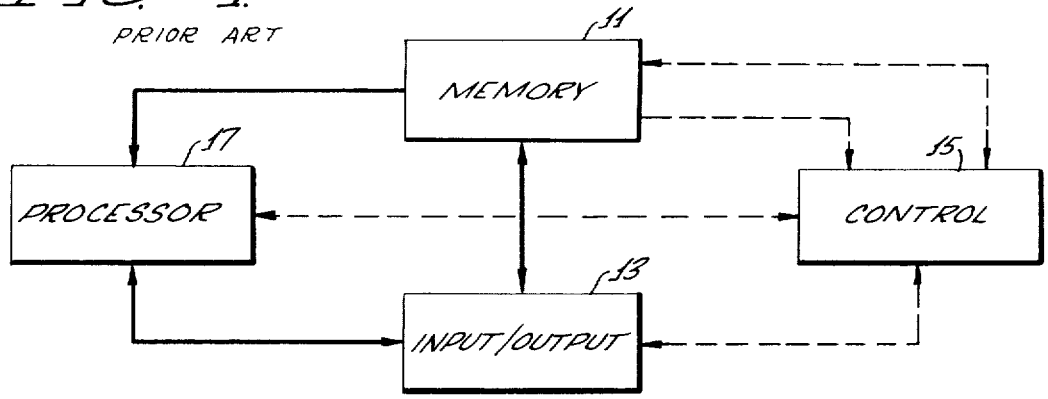
FIG. 1.
PRIOR ART
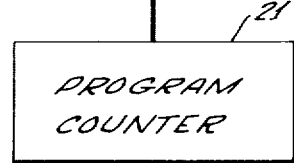
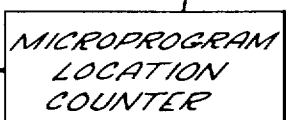
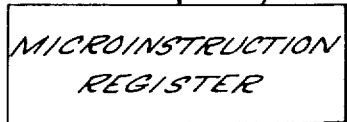
FIG. 2.
PRIOR ART

Fig. 3. PRIOR ART

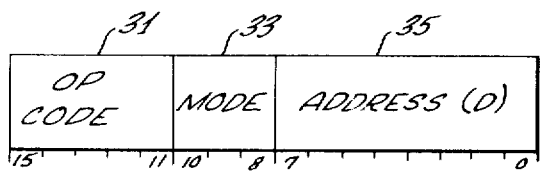

| OP CODE | MODE | ADDRESS (D) |
|---|---|---|
| 15    11 | 10  8 | 7    0 |

Fig. 5. PRIOR ART

| MICROINSTRUCTION | ADDRESS |
|---|---|
| INCREMENT PROGRAM COUNTER | 0 0 0 0 0 1 |
| LOAD INSTRUCTION REGISTER | 0 0 0 0 1 0 |
| MOVE INSTRUCTION TO TEMPORARY REGISTER | 0 0 0 0 1 1 |
| PLACE ZEROS IN 10 LEAST SIG. BITS IN TEMP. REG. | 0 0 0 1 0 0 |
| MOVE BITS 11-15 TO POSITIONS 0-4 IN TEMP. REG. | 0 0 0 1 0 1 |
| PLACE 001 IN BITS 7,6,5 OF TEMPORARY REG. | 0 0 0 1 1 0 |
| ADD CONTENTS OF TEMPORARY REG. TO 000111 | 0 0 0 1 1 1 |
| PLACE BITS IN TEMP. REG. IN MICROPROGRAM CTR. | 0 0 1 0 0 0 |
| REGISTER DECODE - PLACE 110011 IN MICROPGM. CTR. | 0 0 1 0 0 1 |
| I/O DECODE - PLACE 111000 IN MICROPGM. CTR. | 0 0 1 0 1 0 |
| JUMP DECODE - PLACE 111100 IN MICROPGM. CTR. | 0 0 1 0 1 1 |
| MEMORY DECODE - PLACE 101101 IN MICROPGM. CTR. | 0 0 1 1 0 0 |
| MOVE INSTRUCTION TO TEMPORARY REG. | 1 0 1 1 0 1 |
| PLACE ZEROS IN 8LSB AND 5MSB IN TEMP. REG. | 1 0 1 1 1 0 |
| MOVE BITS 8-10 TO POSITIONS 0-2 IN TEMP. REG. | 1 0 1 1 1 1 |
| PLACE 010 IN BITS 7,6,5 OF TEMP. REG. | 1 1 0 0 0 0 |
| ADD CONTENTS OF TEMP. REG. TO 010001 | 1 1 0 0 0 1 |
| PLACE BITS IN TEMP. REG. IN MICROPGM. CTR. | 1 1 0 0 1 0 |
| MOVE INSTRUCTION TO TEMP. REG. | 1 1 0 0 1 1 |
|  | 1 1 0 1 0 0 |

MICROPROGRAM LOCATION COUNTER (23)

32 LOCATIONS PRIMARY DECODING

MODE BIT DECODING

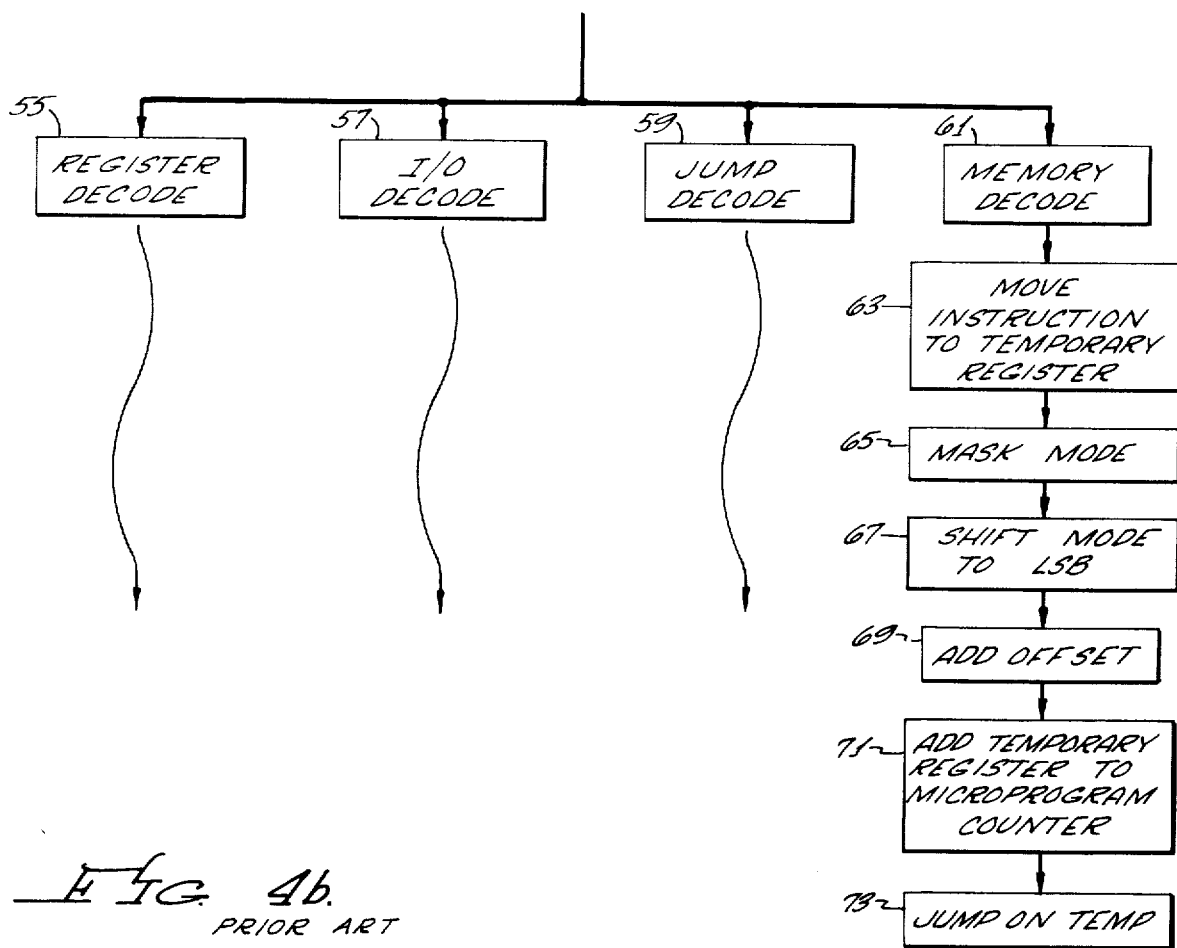
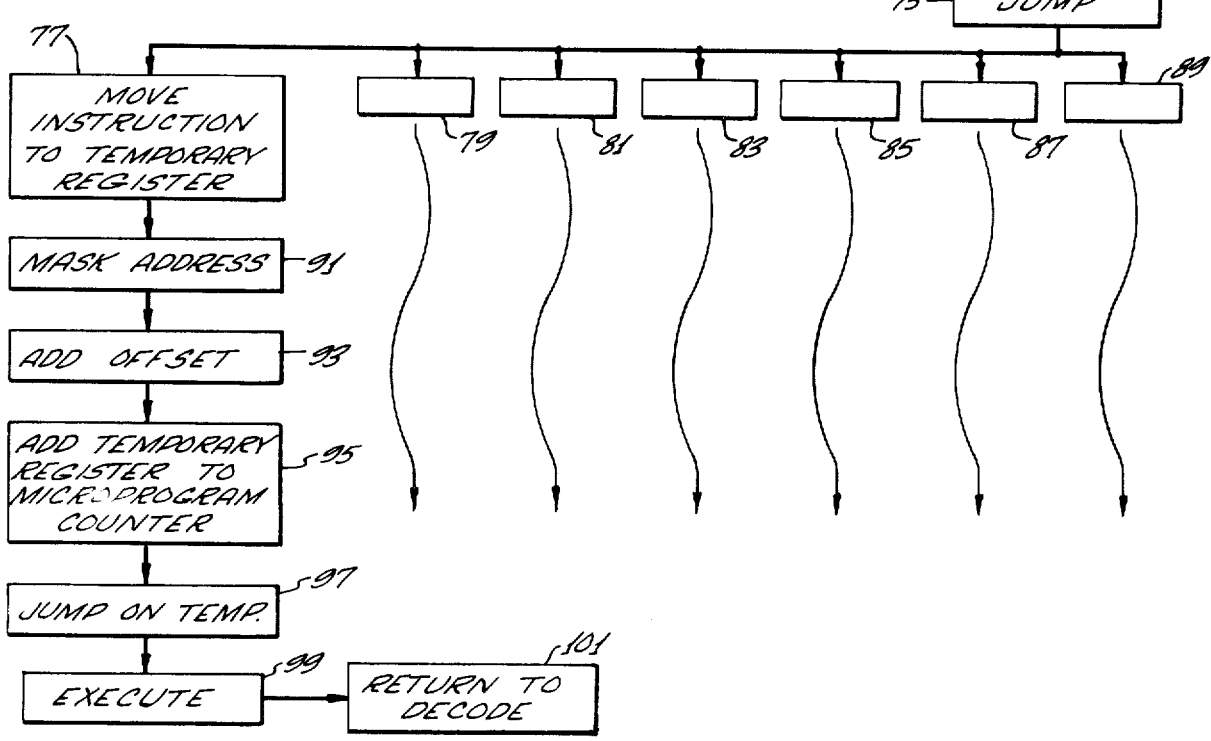
FIG. 4b.
PRIOR ART

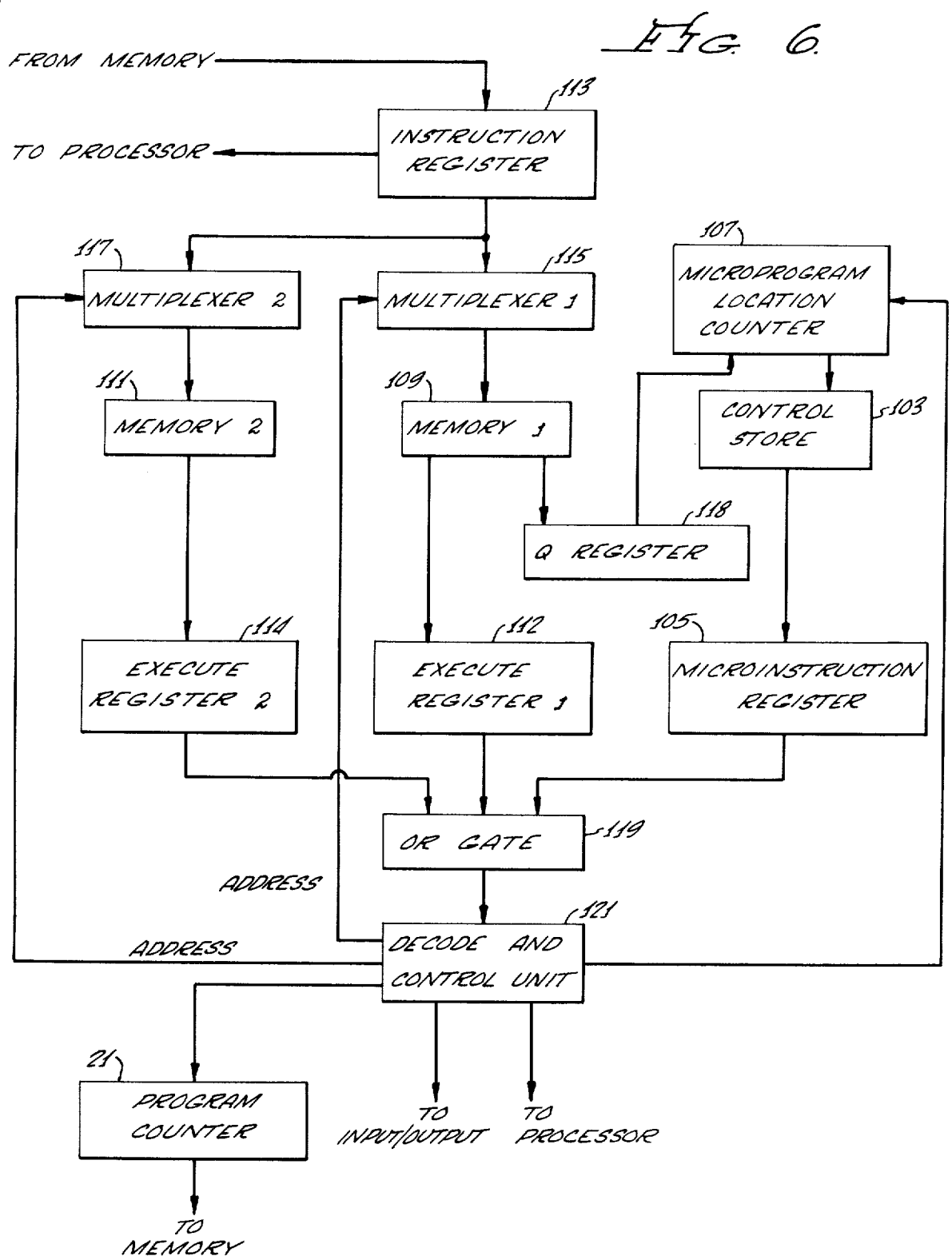

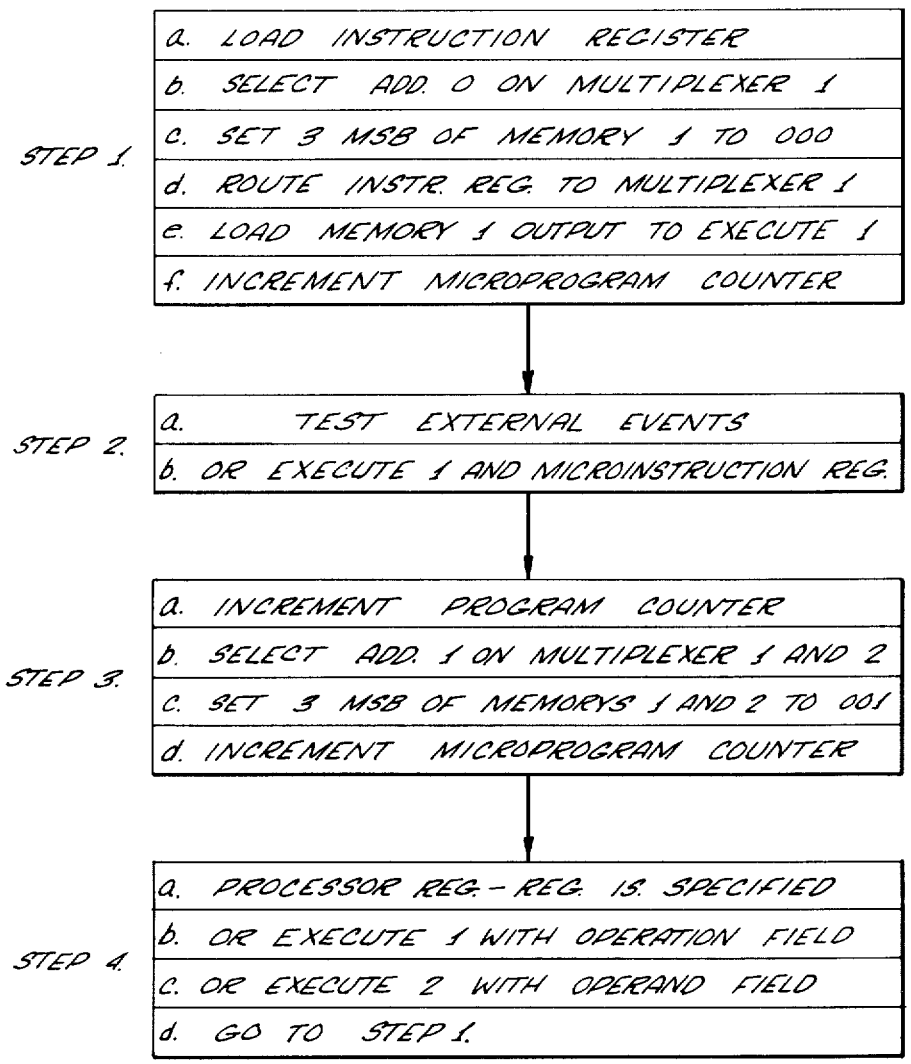

MICROPROGRAMMABLE COMPUTER HAVING A DUAL FUNCTION SECONDARY STORAGE ELEMENT

BACKGROUND OF THE INVENTION

This invention relates to microprogrammable computers and more particularly to a control unit for such a computer which permits more rapid and efficient decoding and execution of operational instructions.

In a modern digital data processor, such as a computer, a sequence of instructions called a program controls the operations performed by the computer. A programmer prepared the sequence of instructions which tells the machine what to do, step by step, in solving a particular problem.

The procedure for programming a problem generally includes two separate steps. In the planning step, the programmer determines the sequence of operations required to solve a particular problem. In the coding step, these operations are written in a special format which details the precise operations the computer is to perform.

The programmer may write the program in terms of what are called "macroinstructions," as an example, "determination of square root" would constitute a macroinstruction. Each macroinstruction, when written in machine language, is made up of a set of machine instructions. Examples of such machine instructions would be "add" or "subtract." A machine instruction, in turn, is made up of microoperations. A microoperation is performable in response to a single pulse. An example of a microoperation would be the transfer of information from one storage register to another.

A machine instruction may be considered a "program" of microoperations or a microprogram. Such a microprogram, however, is a portion of the hardware of the processor in a standard processor. Thus, whereas the programmer may be able to devise many different programs for the solution of the same problem in different ways, the standard hardware of a standard processor will always carry out the microsteps to perform a given operation in the same way.

A machine is strictly microcontrolled, if and only if the decoding network is combinational. In a phased microcontrolled machine the decoding network consists of a combinational network preceded by delays, which provide different but fixed delays for the signals emanating from the control store.

More recently, processors have been constructed using read only memories which contain binary representations of each microoperation. Each word of the memory will generally represent a set of one or more microoperations all of which may be performed at the same time. The address of each word within the memory is defined by a particular machine instruction and by a location within the microprogram of that instruction.

Some recent machines include a programmable memory in the place of the read only memory so that the microoperations of the machine may be altered by the programmer in order to change the basic operation of the computer system. This is often done, for example, to permit a given computer to emulate many other computers by making the microsteps within the computer conform to the microsteps which are stored in the hardware or read only memory of the emulated machine.

One of the most severe limitations of the current microprogrammable processors is the relatively long period of time required to decode machine language instructions within the read only memory. Thus, for example, it is common to require 15 to 60 microinstructions in order to interpret and decode one machine language instruction, which requires approximately 3 to 12 microseconds when the clock rate is 5 MHz. Since such decoding is necessary prior to the outputting of command signals to control computer operations, microprogrammable computers have historically provided flexibility and cost economics only at the expense of rapid computation.

SUMMARY OF THE INVENTION

The present invention is directed toward accomplishing substantial time savings in the period required for decoding and executing of machine language instructions within a read only memory system. This is accomplished fundamentally by permitting a number of different operations of the decoding sequence to occur simultaneously, the required information from each of the simultaneous steps being stored until it is convenient to merge the information from storage to form a decoded microinstruction.

This is accomplished by utilizing, in addition to the typical control storage which is a read only memory or a read and write memory, a secondary read only memory similar to the control store. This secondary memory is typically connected through a multiplexer or other combinatorial logic network to the instruction register to receive a portion of the machine language instruction to be decoded. The portion of the instruction to be decoded and its format is determined by the multiplexer. In addition, the secondary memory can be connected to other parts of the machine to receive signals defining the state of the machine.

The secondary storage element is connected to an output register and this register is in turn connected to the main control store of the computer and used to address this main control store. It can be seen, therefore, that this secondary memory device can be used, through its output register, to address the control store and therefore can replace jump tables within the principal control store. In addition, the output of this secondary memory system may be stored and the secondary memory itself may therefore be used to translate the portion selected from the machine language instruction so as to form a part of the output microinstruction to be produced in the decoding sequence. This decoded output word will be stored in a register associated with this secondary memory until the functions of the control storage have been completed and the outputs of these systems will then be merged to produce an output microinstruction.

It is this dual usage of the secondary storage, that is, the usage both to produce a decoded portion of the desired microinstruction and the usage as a jump table for accessing the control storage which permits the accomplishment of extremely rapid decoding operations which significantly reduce the time required to decode machine language instruction words.

These and other advantages of the present invention are better understood through a reference to the drawings, in which:

FIG. 1 is a block diagram of a particular data processor which may implement the present invention;

FIG. 2 is a block diagram of a prior art control unit as utilized in the data processor of FIG. 1;

FIG. 3 is a diagram showing the particular format for the machine language instruction utilized in a minicomputer;

FIGS. 4a and 4b are a flow chart showing the sequence of microoperations typically utilized in a microprogrammable computer such as that shown in the block diagram of FIG. 2;

FIG. 5 is a schematic illustration of the microinstructions stored in the control store of the computer of FIG. 2 to accomplish the sequence of operations shown in the flow chart of FIG. 4;

FIG. 6 is a schematic block diagram of the computer of the present invention;

FIG. 8 is a flow chart showing the steps used to accomplish a decoding of machine language instructions in the computer of FIG. 6.

DETAILED DESCRIPTION OF THE PREFERRED EMBODIMENT

Figure 4A:
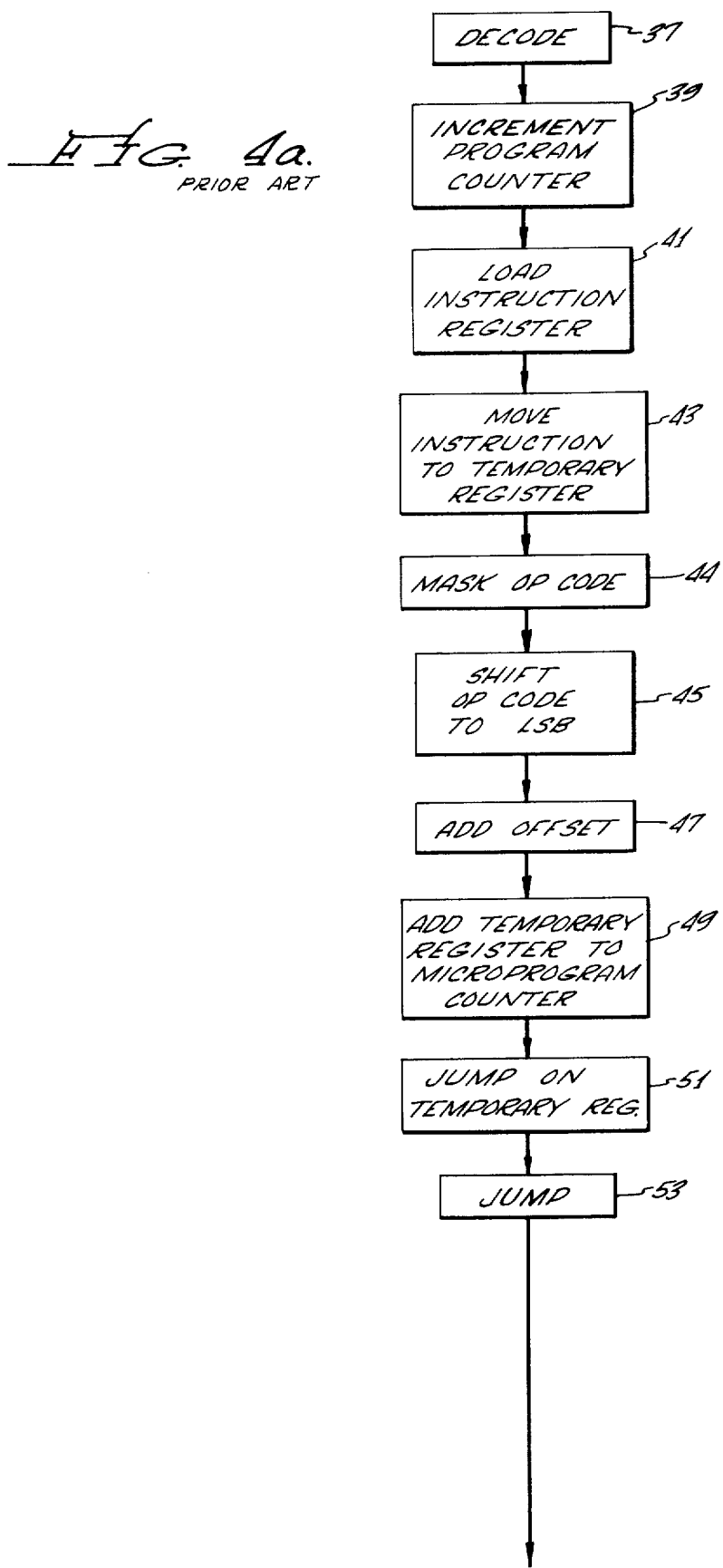

In order to present a thorough description of the preferred embodiment it is helpful to first describe the fundamental operation of a microprogrammable computer and the fundamental distinction between such a computer and a standard "hard-wired" data processing system.

The typical "hard-wired" processor is designed to accept a specific language of instructions, typically referred to as the computer's machine language or basic instruction set. Recently these instruction sets have become relatively complex to permit the data processor to solve a great variety of problems. Such instruction sets may include as many as 300 to 400 machine language instructions. A computer programmer typically prepares a program for the computer in what is called compiler language, such as COBAL, FORTRAN or RPG, and this compiler language is translated through a special computer routine into an instruction program in the machine language of the computer to be used. Thus, each such compiler language program will be equivalent to a variety of different machine language programs depending upon the particular computer which is to be utilized. The basic instruction set is determined by the particular control section in the computer to be used since each of the instructions of the machine language set are "hardwired" in a typical data processing system. Thus, the control system includes a specific "hard-wired" coding sequence for each of the particular machine language instructions. The "hard-wire" control section of these computers therefore totally determines the system architecture of the data processing system and determines the functional behavior of the computer as seen by the computer programmer. All of the physical implementation of data flow and data control are determined by the control system.

The control section must therefore be capable of fetching machine language instructions from the main memory of the computer, of decoding these instructions to determine the type of operation which is required (for example, a memory reference operation, a register operation or an input-output operation) and to generate and sequence signals to manipulate the data paths within the computer between the arithmetic unit, the main memory and various internal storage elements or machine registers within the computer. The control unit also determines a destination for the results achieved which may typically be either the main memory, machine registers or an output bus. It can be seen, therefore, that the total number and complexity of the operations which are available to the programmer is determined by the capability of the control section to generate such signals. The control section must also be capable of determining what the next step of a sequence is. That is, it must be capable of sequential instruction execution if, for example, the current instruction is a data manipulation or nonsequential instruction execution if the current operation is a jump or branch step which is dependent upon the current operation.

Since, as stated previously, the entire control section of the typical "hard-wired" computer is determined in the design of the computer, the operations which the computer can perform and the ultimate performance of the computer as seen by the computer programmer are fixed. It is possible to make such "hard-wired" circuitry operate extremely rapidly so that the inherent inflexibility of the computer and the significant cost and complexity of the control system required to interpret a rich machine language instruction set are offset by the speed of computation. Obviously, as the functions which the "hard-wired" processor are capable of performing are increased the amount and complexity of the control section logic increases, substantially increasing the cost of the processor. Changes or additions to this basic computer architecture are extremely difficult since the circuit are hard wired into the system.

Alternatively, what is typically referred to as a microprogrammed computer includes, in addition to the machine language set, a micro language. This micro language is an extremely simple language set which is implemented by "hard-wired" logic circuitry within the control circuit. The remaining processing required to make up the machine language instruction set is accomplished in a separate control storage element, typically a read only memory or a writable memory, which has the capacity to translate a machine language instruction into a sequence of micro language instructions. The microprogrammable computer therefore must have the capability of decoding in the control store each machine language instruction in order to produce a series of output microinstruction words which will be used to accomplish a series of microsteps within the "hard-wired" decoding section of the computer to accomplish the machine language step.

The use of such microprogrammable techniques permits changes or additions to the fundamental architecture of the system. Thus, new instructions can be integrated into the system without changing the existing "hard-wired" logic, since the microsteps included within the repertoire of the "hard-wired" control of the microprogrammable computer can be combined differently to accomplish such new functions. The desired additional machine language operation is simply added as an additional routine within the control store.

In order to make such microprogram computers as flexible as possible, the control storage element in many such processors, or at least a portion thereof, has been constructed as a writable memory. That is, it is accessible by the programmer to change the basic system architecture so that different machine language instructions may be interpreted. It will be readily understood from this explanation that great cost savings can be realized since the "hard-wired" logic of the data processor can be greatly simplified, it being required only to interpret the small number of microinstructions of the microinstruction set. It will also be recognized that the microprogrammable computer is extremely flexible in that it is capable of emulating a large number of "hard-wired" systems. These advantages are typically realized only at the expense of poor time efficiency, due to the many decoding steps required by the control section of such a computer to implement a particular machine language instruction.

Referring now to FIGS. 1 through 4, the operation of a typical microprogram computer control store to implement a typical machine language instruction will be described so that the improvements of the present invention which are later described as an alternate to this decoding system may be better understood. Referring initially to FIG. 1, an overall block diagram of a typical data processor, whether "hard-wired" or microprogrammed, is shown. Such processing systems typically include a main memory 11 which is designed to store the machine language program and data to include a number of buffers or registers which may be accessed by the computer system when temporary storage is required. This memory 11 is connected by data lines to an input-output unit 13 which permits the storing of information into the memory 11 and permits the memory to read data to output devices for the output of results and for communication with the programmer. The solid line connecting the memory 11 to the input-output device 13 identifies these data lines. All such transfer of data is controlled by control signals shown by short dashed lines between a control unit 15 and the memory 11 and the input-output device 13. In addition, the control unit supplies control signals to a processor 17, as shown by the dashed control line, and the processor operates on data from the memory 11 and the input-output device 13 as shown by solid lines. The long dashed line between the memory 11 and the control unit 15 identifies an instruction line, that is, the machine language program instructions which are stored in the memory 11 and which are accessed by the control 15 to determine the proper sequencing of events within the computer system. It can be seen from the diagram of FIG. 1 that the control 15 is the central sequencer, and determines the events which will occur for all operations within the computer. This control unit 15 selects data sources and data paths to a desired processing unit and selects the desired modes of processing. In addition, the control unit will produce timing pulses for control of the logic systems within the computer in order to properly sequence the events which occur. As stated previously, the control 15 of a standard "hard-wired" computer might have the "hard-wired" capability of producing a series of control pulses in response to some three to four hundred different instruction signals from the memory 11. Similarly, the microprogrammed machine will respond to a great variety of instructions from the memory 11. But rather than producing three to four hundred different control sequences, will produce only a greatly reduced number, such as ten or twelve control sequences, many of which will be combined to accomplish one instruction from the memory 11. A machine is strictly microcontrolled, if and only if the decoding network is combinational. In a phased microcontrolled machine the decoding network consists of a combination network preceded by delays, which provide different but fixed delays for the signals emanating from the control store.

Referring now to FIG. 2, the organization of the control unit 15 of a typical microprogrammed computer may be described. The control system, as stated previously, receives instructions from the computer main memory for storage in an instruction register 19. The machine language instruction word from the main memory 11 is stored in the instruction register 19 during the entire implementation sequence of this instruction word. The instruction register 19 is either a part of the processor 17 or the control unit 15 of the computer, but at any rate, as shown in FIG. 2, it is accessible by the processor 17 so that the machine language instruction within the register 19 may be manipulated by the processor 17 in accordance with control signals from the control unit 15. The control unit 15 additionally includes a program counter 21 which stores the present location of access of information from the main memory 11 and may be updated by the control unit 15 to fetch new data from the main memory.

In addition, a microprogram location counter 23 is used in a similar manner to fetch microinstructions from the control store 25 of the control unit 21. The control store 25 is typically either a read only memory or a writable store which is addressed by the microprogram location counter 23 to output stored microinstructions to a microinstruction register 27. The control store 25 is utilized to sequence the events which are necessary for the fetching of data from the main memory 11, the decoding of the microinstructions into microsteps and the execution of the microsteps in the proper sequence. Such read only memory devices and writable memory devices are well known in the the computer art and may typically include, for example, a bipolar read only memory where the bit pattern is installed by the manufacturing process, a field programmable read only memory where the bit pattern is installed by the user or a writable control memory typically capable of being written at a relatively slow speed and read at a relatively high speed. Thus, under the control of the microprogram location counter 23 the control store 25 will output to the microinstruction register 27 a sequence of control instruction words which will be conducted to a decode and control unit 29. This decode and control unit 29 is typically "hard-wired" and capable of decoding any of the microinstruction words from the register 27. As explained previously, the decode and control unit 27 of such a microprogrammable computer is significantly simpler in construction than the decode and control unit of a standard "hard-wired" processor since the variety of microinstructions is significantly smaller than the great variety of machine language instructions which will be stored in the instruction register 19 and no sequential functions are required. The decode and control unit 27 will produce output signals to the processor 17, the input-output unit 13, memory unit 11, the microprogram location counter 23 and program counter 21 in a proper sequence, along with timing control pulses in order to implement each of the various microinstructions.

Referring now to FIG. 3, a typical format for a computer machine language instruction which is stored in the main memory 11 and which will be transferred to the instruction register 19 is shown. This instruction includes an operation code or opcode portion 31, a series of memory reference mode bits 33 and a series of address bits 35 for the case of a data manipulation instruction. Thus, for example, as shown in FIG. 3, the opcode 31 may include binary bits indicative of an instruction to load the A register. The address portion 35 includes a binary code indicating the address of information to be loaded into the A register and the mode bits 33 may be used to increase the flexibility of the instruction. Thus, for example, the instruction of FIG. 3 may be read as follows "load the contents at Y into the A register." In accordance with the instruction, Y is interpreted both in terms of the mode bits 33 and the address bits 35 and may be, for example, any of the following:

$$Y=D+P \quad Y=D \quad Y=C(D+P) \quad Y=C(D) \quad Y=D+P+X$$
$$Y=C(D+P+X)$$

where C indicates "the contents of", D indicates the address 35, P indicates the value currently stored in the program counter and X indicates, for example, an index register. The form which is utilized for interpreting the value of Y is determined by the value of the mode bits 33. In a "hard-wired" computer the instruction of FIG. 3 would be coupled directly to a decode and control unit which would be "hard-wired" to sequence the events required to load the A register with the proper bits. On the other hand, the much simpler steps of the decode and control units of a microprogrammable computer are not capable of such one step operation and a typical operation within a microprogrammable computer for implementing the instruction of FIG. 3 is shown in FIG. 4.

FIG. 4 is a flow chart showing the manipulation of data through the control unit 15 shown schematically in FIG. 2. Initially, as shown by step 37, the sequence enters a decode routine which is utilized regardless of the form of the instruction received from the instruction register 19 in order to initially classify the instruction. It should be understood that instructions fall generally within classes, some of which may be designated as follows: (A) register to register operations, (B) input-output operations, (C) jump operations, (D) memory reference operations. Load A is a register to register operation and the decoding sequence beginning at step 37 will make this initial determination. Once this sequence has been completed, it will be necessary both to decode the specific type of register to register operation and to decode the operand to determine the address of the information to be shifted.

The decode sequence 37 is initiated with an incrementing of the program counter 21. This has the effect of fetching the instruction from the memory 11. Referring to FIG. 2, this step is accomplished, as with every other step in this sequence, by outputting from the control store 25 under a control signal from the microprogram counter 23 an instruction to the microinstruction register 27 which is shifted to the decode and control unit 29 to produce an output signal which both updates the microprogram counter 23 to the next instruction count in the sequence and updates the program counter 21 to initiate a fetch operation in the main memory 11. It should be understood that this sequence is followed throughout the entire following example, in each instance the control storage 25 outputting a signal to increment the microprogram counter 23 to the next sequential stored microstep or to a step to which the control storage has been jumped, as will be explained below, to initiate the next sequence.

At block 41 the instruction register is loaded by the data which has been fetched from the main memory 11. At step 43, the instruction is shifted to a temporary storage register for manipulation. This temporary storage register may be located in either the main memory or the processor unit but typically is located in the processor. Since the format of the instruction word is in accordance with the format of the minicomputer which is being emulated and not necessarily in the proper format for operating the decode and control unit 29 of this system, it is necessary to implement a translation of this code. This is accomplished in the following steps. At step 44, bits 0 through 10 are set to zero to mask all of the instruction except the opcode portion. In step 45, bits 11 through 15 are shifted to bits 0 through 4 in the temporary storage so that the opcode will occupy the first five bits of the temporary storage. At step 47, more significant bits, such as bits 5, 6, 7 etc., may be added to the opcode stored in the temporary register as an offset in order to determine the location of the jump which is to occur later, as will be explained below.

At step 49, the value stored in the temporary register; that is, the opcode with the more significant bits added as an offset in step 47 are added in the processor to the present value of the microprogram location counter 23 and the sum is placed in the temporary register. At step 51, the value thus stored in the temporary register is utilized to replace the value which has been stored in the microprogram instruction counter 23. The instruction counter, being thus updated, will read from the control store 25 a new output instruction, not in sequence, but updated by the value of the opcode plus the more significant bits which have been added as an offset. It may be seen, therefore, that we have enabled a new sequence of microinstructions to occur by jumping to a location within the control storage in accordance with the value of the opcode and the offset.

To explain this operation more completely, it is helpful to refer momentarily to FIG. 5.

FIG. 5 schematically illustrates the information which is stored in the control store 25. This information is stored in a regular pattern, the microinstruction counter 23 being utilized to locate and read information out of the control store. As can be seen, the initial instructions coded into this control store are the instructions indicated previously; that is, instructions for updating the program counter, for moving the memory data into the instruction register, for moving the opcode to a temporary register, for masking the opcode, for moving bits 11 through 15 to bits 11 to 4 in the temporary register to shift the opcode to the least significant bit and for adding an offset to the more significant bits in the temporary storage. The next sequence adds the opcode to the current value of the microprogram counter, namely 000111, and updates the microprogram counter to the value stored in the temporary storage register. At this point it can be seen that a jump occurs within the control store 25. This jump is determined both by the offset value which was added at step 47 and by the value of the opcode itself. Since the opcode includes 5 bits, a total of 32 different possibilities is available for this jump. Therefore this block of 32 different instructions is shown in FIG. 5 as the primary partial decoding step, this block of 32 instructions being offset from the previous routine by the value of the offset added at step 47. Since the value of the opcode determines which of these 32 locations will be specified by the microprogram location counter 23, the output from the control store 25 to the microinstruction register 27 is determined by the value of the opcode so that a direct translation of the opcode to the equivalent microinstruction language is possible.

Returning now to FIG. 4, the jump which occurred at step 51 initiates a second jump, as specified by the control store contents at each of the 32 possible jump locations achieved in step 51. This second jump at step 53 is advantageous since it is desired to reach a particular decoding routine determined by the particular form of the opcode. Since these various routines will vary in length depending upon the particular operation to be achieved, the second jump permits a direct access into a variety of routines having different and arbitrary lengths. This jump may be as shown at address 001100 of FIG. 5, jumping to address 101101. The particular decoding routine is now accomplished, typically in a sequential fashion, by progressively steping through the control store 25 and by reading the microinstructions to the microinstruction register 27 and the decode and control unit 29.

The decoding routines selected at step 53 are shown in FIG. 4 as beginning at steps 55, 57, 59 and 61. Each of these routines begins a new sequence to decode the operand, that is, the significance of the mode and address bits shown in FIG. 3. The block 55 and following may be, for example, the sequence for a register to register operation and similarly blocks 57 and 59 may be the sequences utilized if the opcode has been determined to be an input-output operation or a jump operation. The block 61 and following is the sequence utilized if the opcode has designated a memory reference instruction, such as the load instruction being described, and will be explained in detail and will be understood to be exemplary of the sequences following blocks 55, 57 and 59.

At step 63 the instruction is moved to a temporary storage register. At step 65 the mode bits are masked by placing zeros in the address and opcode locations, and at step 67 these mode bits are shifted to the least significant bits in the temporary storage register. At step 69, more significant bits are added as an offset. It will be noted from FIG. 3 that there are three mode bits, and thus the fourth, fifth, etc. bits may be added to the temporary storage register so that when a jump occurs it will address a selected address bit decoding group of instructions in the control storage. At step 71 the value stored in the temporary storage register is added to the microprogram counter to prepare for a jump and at step 73 the microprogram counter is updated to the value in the temporary storage register so that a selected address decoding sequence may begin. As previously indicated, a second jump step 75 may be useful since the particular address decoding sequences for the various mode bit formations may be of different lengths. The sequence just described is quite similar to the opcode decoding sequence and shifts the control storage sequence into one of seven routines as required by the three bit mode instruction. These various routines may be used, for example, to decode the operand in accordance with the form of the address as previously indicated. Thus, for example, the step 77 and following may be used to decode addresses when the address is designated as Y=D+P. Similarly step 79 and following may be utilized when the address is equal to D, and so on for the various forms in which the address may be designated in blocks 81 through 89. The sequence which follows each of these blocks to determine the value of the operand is similar, and a detailed explanation will be given only for the sequence following the step 77. At step 77 the instruction is moved to a temporary storage register and at step 91 the address portion of this instruction is masked. At step 93 the address, which is already at the least significant bit portion of the instruction as shown in FIG. 3, is increased by adding a new series of more significant bits as an offset. The address, as will be noted from FIG. 3, occupies bits 0 through 7, so, for example, bits 8 and 9 might be added in step 93. At step 95 the value thus achieved in the temporary storage register is added to the microprogram counter value and at step 97 a jump is accomplished on the value which is stored in this temporary storage register. After this jump, the address value is added to the value in the program counter, as required for this particular adddress determination, and control is shifted to an execute step 99 in order to carry out the load instruction, the entire instruction having been previously decoded. Control then shifts at step 101 to decode, that is, the beginning of the sequence, so that the next machine language instruction may be decoded.

It will be readily understood from the previous explanation that the decoding sequence required in order to accomplish in microsteps what is required for given machine language instruction are often extremely complex and require a great number of microsteps. In order to solve this inherent inefficiency in microprogramming computers, the present invention bypasses a large number of steps by permitting shortened jump sequences and by additionally permitting many of the steps to occur simultaneously.

FIG. 6 is a schematic block diagram of the control circuit of the computer of the present invention. As can be seen from this figure, the basic structure has been changed by adding to the standard control storage 103, microinstruction register 105 and microprogram counter 107 an additional pair of read only or writable memories 109 and 111, each of which is similar in construction to the control store 103. These memory units 109 and 111 are connected to the instruction register 113 through a pair of combinatorial logic networks, for example, multiplexers 115 and 117, the function of which will be described below. Alternatively, other registers and control signals of the machine may also be connected to the multiplexers 115 and 117. Combinatorial logic networks are defined as a network which implements a logic function exclusively with logic gates without any delay elements (e.g. flip-flops), and includes, for example, combinations of AND, OR, NAND, NOR, EXCLUSIVE OR, EXCLUSIVE NOR gates. Each of the storage elements 109 and 111 is utilized to store data in a pair of execute registers 112 and 114 and, in addition, the storage unit 109 is used to store data in a register 118 which is connected to the control store 103 and may be used in place of the microprogram counter 107 to address the control store 103. Each of the microinstruction register 105 and execute registers 112 and 114 are utilized to decode particular portions of a machine language instruction and are merged through a combinatorial logic network, such as an OR gate 119 to operate a decode and control unit 121. It is possible with the appartus which is shown schematically in FIG. 6 to extremely rapid decode different portions of the machine language instruction, such as the opcode, the mode bits and the address bits, and to merge the various decoded instructions through the OR gate 119 in order to more rapidly accomplish the machine language instruction operation. In addition, the storage element 109 may be utilized, through the register 118, as a jump table for the control store 103 in order to alleviate many of the steps previously required for the jump operation.

Figure 7:
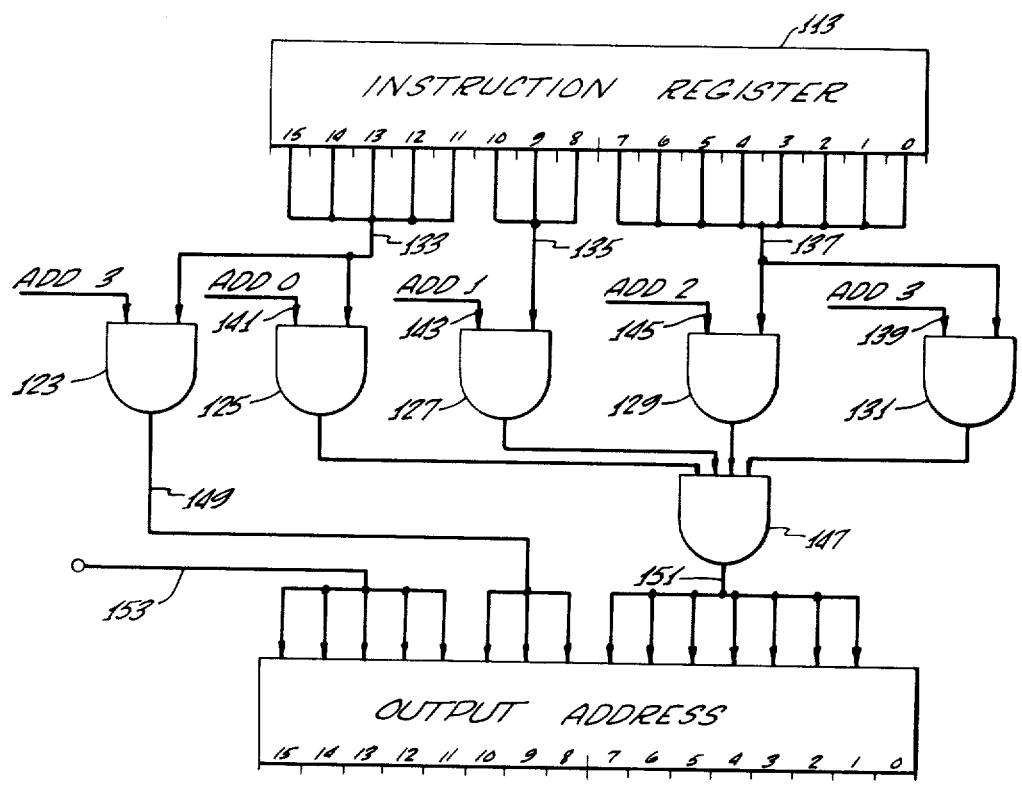
FIG. 7 is a schematic illustration of the multiplexers shown in FIG. 6.

In order to fully understand the operation of the circuit shown in FIG. 6 the operation of the multiplexers 115 and 117 will first be explained in reference to FIG. 7 and a typical sequence will be explained for the circuit in reference to the flow chart of FIG. 8. Turning now to FIG. 7, the multiplexer is essentially a group of AND gates such as the gates 123 through 131 which are hard wired to the instruction register 113. These gates may each in actuality represent a plurality of gates such that those gates which are wired to a first portion of the instruction register shown as 133 actually each include plural gates responsive to each bit of the opcode portion of the machine language instruction and the gates which are wired to portions 135 and 137 of the instruction register 113 are responsive, respectively, to the mode bits and the address bits. In addition to these inputs to the AND gates 123 through 131, address inputs to each of the gates 139 through 145 are included. It will be noted that the output of the gates 125 through 131 are each combined in an OR gate 147 so that if any of the gates 125 through 131 is enabled, the OR gate 147 will be enabled. If address 139 is energized, it can be seen that the opcode, which is connected to gates 123 by line 133, will be outputted from the multiplexer on line 149 at a particular bit location. Similarly, due to the energization of gates 131, the address bits on line 137 will be outputted in a particular bit location, namely the least significant bit location, on line 151. The most significant bit location will be occupied by zeros as shown by the line 153.

If, on the other hand, the address input 141 is energized, the opcode from line 133 will be placed in the least significant bit location. Similarly, if addresses 143 or 145 are energized, the mode bits or address bits on lines 135 and 137, respectively, will be placed in the least significant bit location.

From the preceding example, it can be seen that, by the use of a plurality of address inputs, the multiplexer permits both the shifting and masking of bits in the instruction register 113, so that the output is equivalent to the output of step 47 or step 69 of FIG. 5, that is, the masking and shifting of bits and adding of more significant bits to the different portions of the machine language instruction may be accomplished in one step.

Turning now to FIGS. 6 and 8, the operation of the control unit of the present invention will be explained. The storage element 109 serves a dual purpose, the first purpose being an auxiliary address means for the control store 103. The jump table which, as previously explained, was typically located in the control store 103 in the prior art is included as a portion of the instruction word of the storage element 109 so that, when properly addressed by the multiplexer 115, the storage element 109 will produce an output microinstruction address which may be stored for use when needed in the register 118. At the proper time, this microinstruction address may be outputted from the register 118 to the control store 103 in response to signals from the decode and control unit 121, in order to implement a jump into the proper location in the control store 103.

This accomplishes two purposes. In addition to removing the requirement for the jump table of steps 51 discussed previously, it permits the decoding of the proper jump value at a time when this decoding is convenient. It will be recognized from the previous example given of the prior art that the decoding sequence must occur in a predetermined order so that steps cannot be accomplished simultaneously. In the present example, the storage of the jump address in the register 118 until needed alleviates this difficulty.

In addition, the storage element 109 contains, as another portion of its instruction words, the equivalent of a control store sequence for decoding a portion of the machine language instruction. This same function is the sole function of the additional storage element 111.

Figure 9:
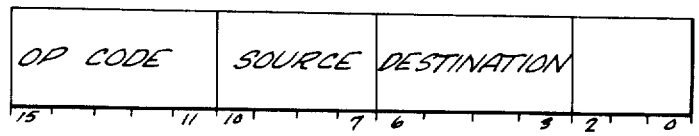
FIG. 9 is a diagram of the format used for a typical minicomputer register to register machine language instruction.

It should be understood that the memory 111, multiplexer 117 and register 114 may be eliminated from the embodiment of FIG. 6 to produce a simplified embodiment of the invention. Furthermore, in addition to the storage elements 109 and 111, an additional plurality of storage strings may be added to the block diagram shown in FIG. 6 by adding an additional multiplexer, storage element and execute register for each of the strings. In each case, the multiplexer is connected to the instruction register 113 and the output of the execute register is connected through gates, such as the OR gate 109, to the decode and control unit 121. It is thus possible to break the decoding operation into a series of parallel strings, each string decoding, in parallel, a part of the machine language instruction, and to combine the results through a gating network to substantially shorten the time required for instruction decoding. To illustrate this advantage, the flow chart of FIG. 8 will be used to show the operation of this system in decoding a typical instruction. In this case, a register to register operation requiring that the contents of a register in the processor be shifted to another register within the processor is decoded. In a typical minicomputer, the processor will include, for example, an accumulator register A, an index register X and an auxiliary accumulator B. A typical register to register operation shifts data between these registers. The format used for a typical register to register machine language instruction for such a minicomputer is shown in FIG. 9 and includes an opcode indicating that this is a register to register data shift, an indication of the source register, and identification of the destination register.

As shown in FIG. 8, the first step, which is common for all instructions regardless of the contents of the machine language instruction, is as follows: The contents of the memory must be loaded into the instrument register as in the prior art. Address 0 is selected on the multiplexer 115 which will have the effect of selecting the first five most significant bits, that is, the opcode, of the contents of the instruction register and will route these bits to the least significant bit location at the output of the multiplexer 115. As shown in step 1c, the selection of the 0 address for the multiplexer 115 additionally sets the three most significant bits of the output word from the multiplexer 115 to a value of 0. At step 1d, the contents of the instruction register are then routed through the multiplexer 115 to the storage element 109, and at step 1e the output of the storage element 109 is loaded into the register 118. This step permits the decoding of the opcode portion of the instruction in the storage element 109 to select a proper jump address for the control store 103, thus preparing the system for a register shift series of microinstructions to be read from the control store 103.

At the same time, as shown by step 1f, the microprogram instruction register is loaded with the next microinstruction; that is, the microprogram counter 107 is sequenced by one count so that the control store 103 outputs the next microinstruction to the microinstruction register 105. Each of the substeps shown in step 1 of FIG. 8 are accomplished in one clock count, and therefore occur simultaneously during operation of the computer. The typical duration of such a clock pulse is 140 nanoseconds.

The next effect of step 1 is that the register 118 has been loaded in accordance with the opcode portion of the instruction and therefore contains the proper address for the control store 103 to initiate the decoding sequence for a register to register operation. In addition, the contents of the memory have been loaded into the instruction register 113 which is a necessary step in any operation. Thus, the operation of loading register 118 has been accomplished without introducing any additional time delay to the computer operation. In addition, as with each step of this or any sequence, the microinstruction register 105 has been supplied with an instruction from the control store 103 to effect the next step, in this instance, step 2.

At step 2, the external events; that is, the operation of the input-output unit, are tested to determine whether the computer operator has introduced an interrupt signal to stop the program sequence or a halt signal has been received, for example, from processing equipment to which the computer is connected in a real time process control operation. If no such external events have occurred, as shown in step 2b, the contents of the register 118 are transferred as an address to the control store 103 so that the address for the proper microinstruction to begin the register shift operation is executed. It should be noted that the external events must be tested in any computer operation and that the operation of step 2b which is used to accomplish the jump to the proper microinstruction in the control store 103 is accomplished in the same clock pulse and therefore requires no additional time. The operation of step 2b is therefore masked by the testing of external events.

In step 3 the microprogram counter is incremented to the location as required by step 2b. The program counter is also incremented in order to initiate a reading of the next machine language instruction from the computer main memory. The memory addressing and reading takes a considerable period of time and it is therefore necessary to set this operation in motion prior to the end of the present sequence so that the next machine language instruction will be ready when needed in the instruction register. This step is a necessary step in the computer operation and therefore the remaining steps of step 3, all of which occur simultaneously, are masked or hidden behind step 3a and require no additional time. At step 3b, address 1 is energized in each of the multiplexers 105 and 107. This selection for the multiplexer 115 will place the source register portion of the machine language instruction of FIG. 9 in the least significant bits and for the multiplexer 117 will select the destination register code to be shifted to the least significant bits for addressing storage element 111. This operation will additionally set the most significant 3 bits of the output of each of the multiplexers 115 and 117 to 001, as shown by step 3c, so that the proper jump location will be added to the portion of the machine language instruction which has been routed to the least significant bits of each multiplexer. At step 3d the microprogram counter is incremented so that the microinstruction register is loaded with the next sequential instruction. The application of the output of the multiplexers 115 and 117 to the storage elements 109 and 111 will automatically load the execute registers 112 and 114. The register 112 thus contains a decoded microinstruction portion indicating the location of the data source and the register 114 contains a decoded portion of the microinstruction indicating the data destination register.

At step 4 the machine language instruction has been decoded in the control store 103 to initiate a register to register function and this is specified by the contents of the microinstruction register 105 stored in step 3. This microinstruction portion is ORed with the contents of register 114 to add to the output instruction destination register identification and is additionally ORed with register 112 which contains that portion of the microinstruction which indicates the source register. Simultaneously, step 4d routes the program control back to step 1; that is, the initiation of a new decoding operation. At this point in time the data which has been accessed from memory will be properly fetched and may be transferred to the microinstruction register as required by step 1.

It can be seen that the entire register to register decoding operation has been accomplished in four clock periods rather than the 20 to 60 clock periods which would have been required under the prior art techniques, so that a substantial increase in the time efficiency of the computer operation has been accomplished by allowing the storage element 109 to produce as an output to the register 118 an address for the control store 103 which may be stored in the register 118 and utilized to address the control store 103 when it is convenient. Additional time has been saved by allowing the multiplexers 115 and 117 to route different portions of the machine language instruction to different storage elements such as the elements 109 and 111 for extremely rapid decoding of different portions of the machine language instruction, which simultaneous decoding is then combined in the OR gate 119 in order to drive the decode and control unit 121 to produce the sequence of output signals required to execute the machine language instruction.

What is claimed is:

1. A microprogram computer having a control element for executing a series of control steps in response to a machine language instruction word stored in a memory, said control element comprising:

a control storage element connected to access data from said memory and storing microinstructions defining plural sequences of steps for decoding portions of said machine language words to produce first output data partially defining control steps for said computer;

a secondary storage element, connected to access data from said memory and responsive to said machine language words for decoding a different portion of said machine language words to produce second output data partially defining control steps for said computer, and for selecting one of said plural sequences of said control storage element in response to said machine language words;

means for merging said first and second output data of said control storage element and said secondary storage element to produce third output data defining said series of control steps for said computer; and a control unit connected to said merging means and producing output timing and controlling data to said computer for execution in accordance with said third output data.

2. A computer as defined in claim 1 additionally comprising:
an instruction register for storing said machine language words; and
a combinatorial logic network connected to said secondary storage element, said control unit and said instruction register, said combinatorial logic network conducting portions of said machine language words selected by said control unit to said secondary storage element.

3. A computer as defined in claim 1 wherein said merging means comprises a combinatorial logic network connected to one output bit of each of the control storage element and the secondary storage element.

4. A computer as defined in claim 1 additionally comprising:
an execute register connected to store the decoding output of said secondary storage element, said execute register outputting data to said merging means in response to a command signal.

5. A computer as defined in claim 1 additionally comprising:
a register connected between said secondary storage element and said control store for storing data indicative of the one of said plural sequences of said control store selected by said secondary storage element.

6. A computer as defined in claim 1 wherein said control storage element and said secondary storage element are read only memories.

7. A microprogram computer having a main memory, input-output unit, processor and control unit wherein said control unit comprises:
an instruction register for receiving from said main memory and storing digital data instruction words;
a control storage unit for storing digital microinstructions in sequence, said control storage unit responsive to input address signals for decoding said instruction words and transforming said words into sequences of microinstructions;
a decode and control unit responsive to said microinstructions for sending data and timing signals to said main memory, input-output unit and said processor to execute said digital data instruction words; and
means responsive to said digital data instruction words and said decode and control unit for both generating said input address signals for said control storage unit and decoding a portion of said digital data instruction words.

8. A computer as defined in claim 7 wherein said means for generating and decoding is connected to said decode and control unit and transmits to said decode and control unit digital data corresponding to said decoded portion of said digital data instruction.

9. A computer as defined in claim 8 wherein said control unit additionally comprises:
a first register interposed between said means for generating and decoding and said decode and control unit for storing said decoded portion of said digital data instruction, said first register being responsive to control signals from said decode and control unit to transfer said decoded portion of said digital data instruction to said decode and control unit.

10. A computer as defined in claim 9 wherein said control unit additionally comprises:
a second register interposed between said means for generating and decoding and said control storage unit for storing said input address signals, said second register being responsive to control signals from said decode and control unit to transfer said input address signals to said control storage unit.

11. A computer as defined in claim 10 wherein said control unit additionally comprises:
gating means interposed between said first register, said control storage unit and said decode and control unit, said gating means merging data received from said first register and said control storage unit and transmitting the resulting merged data to said decode and control unit.

12. A computer as defined in claim 11 wherein said gating means comprises a combinatorial logic network having an input signal from one bit of said first register and one bit of said control storage unit and having an output connected to one bit of said decode and control unit.

13. A computer as defined in claim 8 wherein said control unit additionally comprises:
a combinatorial logic network connected between said instruction register and said means for generating and decoding, said combinatorial logic network responsive to address signals from said decode and control unit to transfer data in formats selected by said decode and control unit from said instruction register to said means for generating and decoding.

14. A computer as defined in claim 7 wherein said control storage unit and said means for generating and decoding each comprise a read only memory.

15. A computer as defined in claim 7 wherein said control unit additionally comprises:
a plurality of read only memory devices, each receiving data from said instruction register and transmitting data to said decode and control unit, said devices each connected to decode a different portion of said digital data instruction words.

16. A microprogram computer including a control unit for decoding machine language data words, said control unit comprising:
a first read only memory containing microinstructions for decoding a first portion of said machine language instruction words in response to input address signals; and
a second read only memory containing microinstructions for (a) decoding a second portion of said machine language instruction words and (b) coupled to said first read only memory for generating said input address signals in response to said first portion of said machine language instruction.

17. A computer as defined in claim 16 wherein said control unit additionally comprises:
a register connected between said first and second read only memories for storing said input address signals.

18. A computer as defined in claim 16 wherein said control unit additionally comprises:
means for merging the decoded outputs of said first and second read only memories to generate a combined digital data output instruction.

19. A computer as defined in claim 16 wherein said control unit additionally comprises:
a third read only memory for decoding a third portion of said machine language instruction words.

20. A method of decoding machine language data words in a computer having a control unit which includes plural read only memory devices, comprising:
storing said machine language data words in an instruction register;
transferring different portions of said machine language data words to different ones of said plural read only memory devices;
simultaneously decoding a portion of said machine language data words in a first one of said read only memory devices and generating an address signal for a second one of said read only memory devices in said first one of said read only memory devices;
decoding a second portion of said machine language data words in said first one of said read only memory devices; and
merging the outputs of a plurality of said plural read only memory devices to produce a decoded data instruction word.

21. A method as defined in claim 20 additionally comprising:
multiplexing said machine language data words prior to said transferring step to properly format said machine language data words for each of said plural read only memory devices.

22. A method as defined in claim 20 wherein said merging step comprises:
transmitting said outputs of said plural read only memory devices to gating means; and
outputting data from said gating means to form said decoded data instruction words.

23. A method as defined in claim 20 additionally comprising:
storing said address signal in a register after said decoding and generating step; and
outputting said address signal from said register to said second one of said read only memory devices.

24. The method as defined in claim 20 additionally comprising:
decoding a different portion of said machine language data words in each of said plural read only memory devices to produce output decoded partial instructions for merging during said merging step;
storing said output decoded partial instructions in plural execute registers prior to said merging step; and
outputting said decoded partial instructions simultaneously from said execute registers for said merging step.

25. A method of decoding machine language instruction words in the control unit of a microprogram computer having plural read only memory devices to produce a series of microinstruction words executable by a decode and control unit, comprising:
decoding first and second portions of said machine language instruction words in first and second ones of said plural read only memory devices, respectively; and
generating an input address signal for said first one of said plural read only memory devices in said second one of said read only memory devices in response to said first portion of said machine language instruction words.

26. A method as defined in claim 25 additionally comprising:
storing the results of said decoding step from each of said plural read only memory devices in plural registers; and
simultaneously merging the contents of said plural registers to form said microinstruction words.

* * * * *